April 13, 1937. J. A. TOLMAN 2,077,080
FLUID BRAKE MECHANISM
Filed July 19, 1935 2 Sheets-Sheet 2
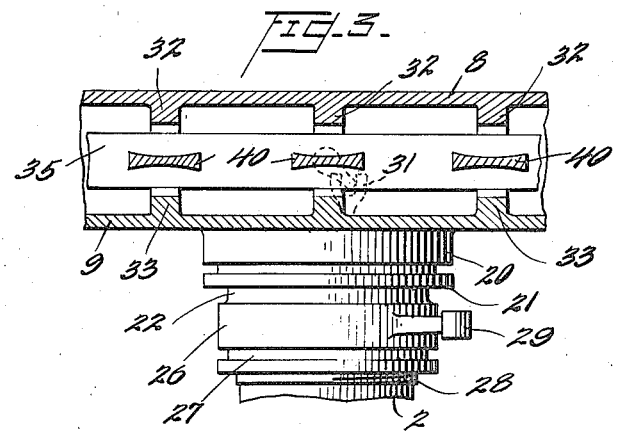
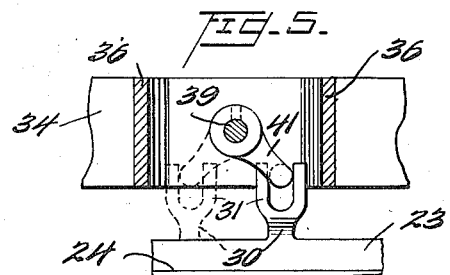
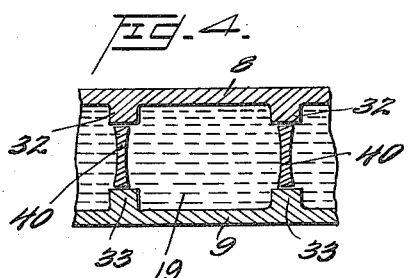
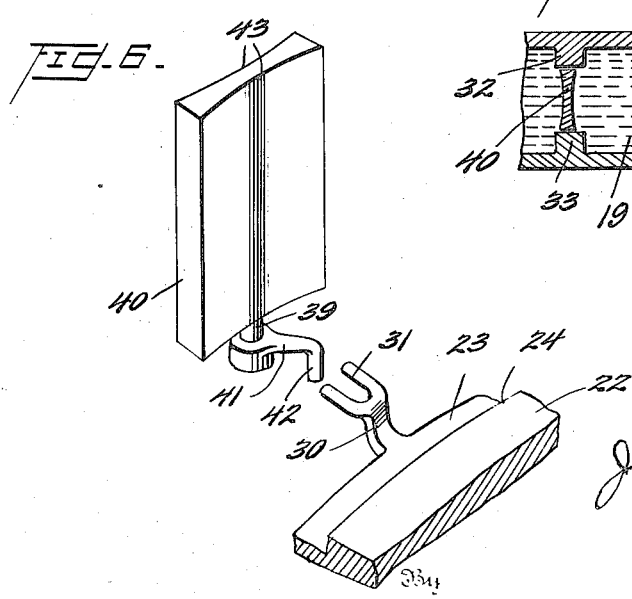

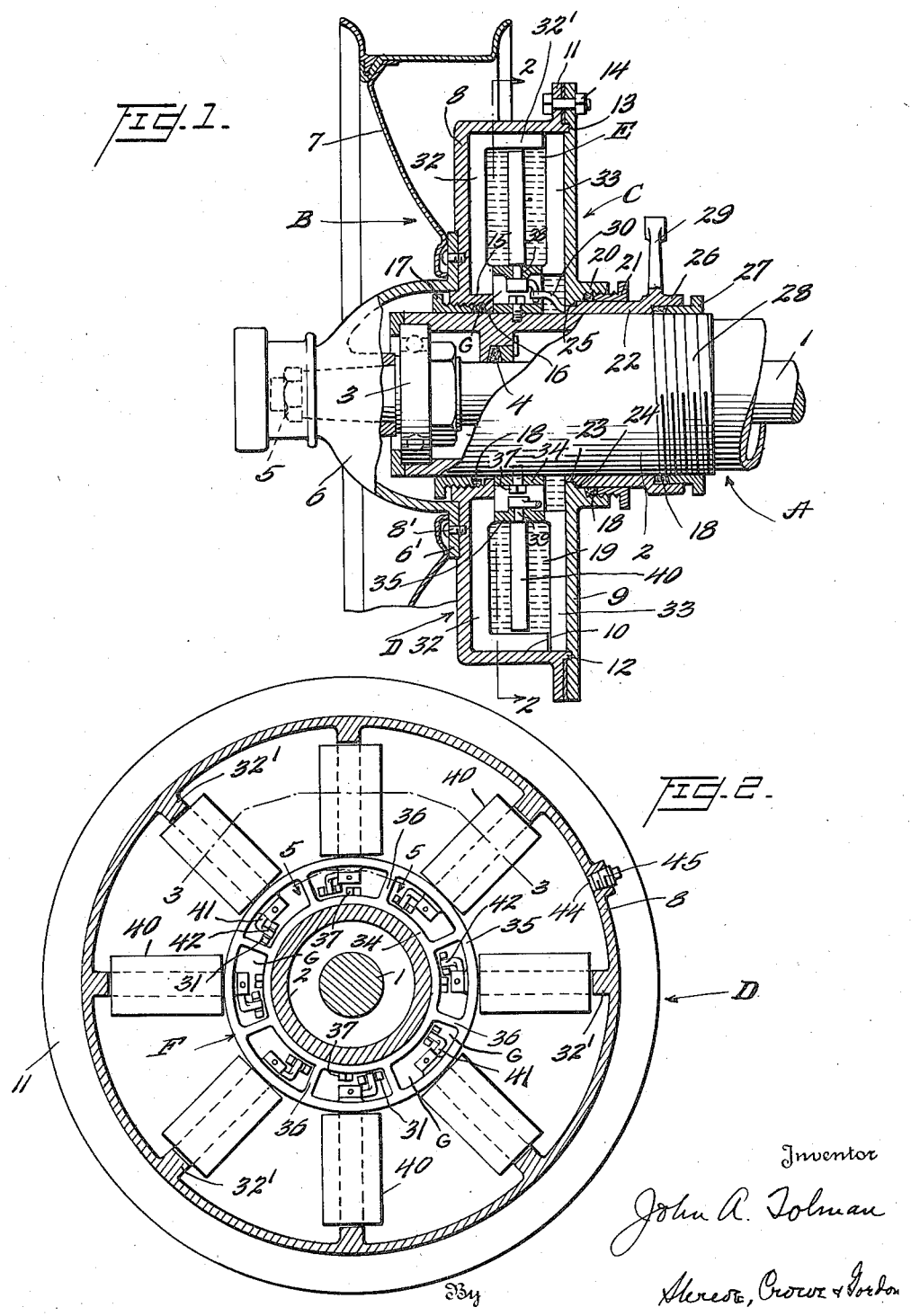

Patented Apr. 13, 1937

2,077,080

UNITED STATES PATENT OFFICE 2,077,080

FLUID BRAKE MECHANISM

John A. Tolman, Watertown, Mass.

Application July 19, 1935, Serial No. 32,268

6 Claims. (Cl. 188—90)

Generically this invention relates to brakes, but it more especially is directed to a braking mechanism wherein a fluid is used as the braking medium.

One of the principal objects of this invention is the provision of a new and improved fluid brake for automobiles, power driven machinery and the like.

While fluid or hydraulic control means have been employed to effect operation of braking mechanisms for automobiles and the like, the present invention relates to a different type of brake mechanism and fluid control, designed to eliminate frictional engageable elements, such as brake bands and the like, by employing the fluid itself as the braking medium.

A further important object of this invention is the provision of a braking mechanism including a drum or casing adapted to carry a fluid, said casing being mounted on and revoluble with the vehicle wheel, means carried by the drum for causing the fluid to normally remain substantially relatively stationary, that is, rotate with the drum, and means mounted stationary with respect to the axle and its housing and operable in braking direction to retard or stop the circulation of said fluid, thereby checking or stopping the movement of the automobile in its particular direction of travel.

Another object of this invention is the provision of a fluid braking mechanism including a fluid containing drum, and fluid control means coacting with said fluid and in conjunction therewith constituting the braking elements, said mechanism being applicable to vehicles already in use, and without material alterations to the existing drum structures.

A still further object of this invention is the provision of a fluid braking mechanism of this character in conjunction with each wheel, including a fluid containing drum adapted to rotate with each of the respective wheels, a plurality of normally stationary fluid control means mounted within each drum, and means for simultaneously operating said control means to check or stop the circulation of said fluid when a retarding influence of the brakes is desired.

Other objects of this invention are: to provide a fluid brake mechanism of this character, wherein the braking elements may be operated in braking relation with the fluid in either direction, that is, irrespective of the direction of travel of the wheels and fluid; means for preventing leakage of the fluid; and a simplified structural arrangement designed to permit application of the device to machines already in use without material alterations to existing structures.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a vertical section through a wheel and brake drum housing.

Fig. 2 is a section on the line 2—2 of Fig. 1.

Fig. 3 is a detail section on the line 3—3 of Fig. 2 showing the blades in open position.

Fig. 4 is a detail view similar to Fig. 3 showing the blades in operative or braking position.

Fig. 5 is a detail section on the line 5—5 of Fig. 2.

Fig. 6 is a detail perspective view of one of the blades and its operating means.

By my improved brake structure I have not only provided a unique simplified fluid braking mechanism, but by eliminating valve and other fluid agitating elements, and by causing the fluid to rotate with the drum and thereby remain substantially stationary with respect thereto, I have eliminated the heretofore prevalent heating of said fluid during the travel movement of the automobile, and by providing a plurality of fluid gate or blade elements normally causing slight frictional disturbance to the fluid, but simultaneously movable by means controlled by the operator to cause back pressure and retard the circulation of the fluid in conjunction with the vane means within the drum to produce the desired braking effect, I have provided the simple, yet effective hydraulic coupling or brake device forming the subject matter of this invention.

In the illustrated embodiment characterizing this invention there is shown an automobile axle structure A, wheel structure B, and fluid brake mechanism C.

The axle structure A comprises axle 1 and stationary housing 2 in which said axle is suitably journaled in ball bearings 3, and which is provided with packing gland 4. The free end of axle 1 extends beyond the end of housing 2 and is provided with threaded nut 5 adapted to secure wheel structure B to said axle when the same is operatively positioned thereon. Said structure B is, in the present instance, of the disc wheel type and comprises the hub portion 6 and disc wheel portion 7 detachably secured in any suitable manner to said hub portion 6 so that extra wheel units may be expeditiously interchanged as desired.

The fluid brake mechanism C and its mounting with respect to structures A and B will now be described in detail. The closed casing or drum D is preferably made in two parts 8 and 9. Part 8 is formed with a cylindrical end wall 10 and adjacent its free edge with the right angular flange 11 and, in the present instance, with an extension 12 adapted to seat in an angular recess 13 formed in the face of part 9. Parts 8 and 9 are secured by a plurality of circumferentially spaced bolts 14. Said drum D is mounted on housing 2 and at the inner edge of the centrally disposed opening through which said casing extends, side 8 is formed with a hub portion 15 extending beyond the opposite surfaces of said side slightly spaced from the housing and terminating at its inner end in a right angular flange 16 adapted to snugly fit said housing. The inner wall of said hub portion is threaded for engagement with the correspondingly threaded surface of the packing ring 17 mounted on said casing. Ring 17 is adapted to engage packing gland 18 so as to prevent leakage of the fluid 19 from said drum and to form with the flange 16 a bearing surface for the drum, as will hereinafter more fully appear.

Side 9 is formed with a hub portion 20 extending outwardly therefrom, spaced from said housing 2, and formed similar to hub 15 to threadedly receive packing ring 21 adapted to engage and maintain in position a similar packing gland 18. Mounted on housing 2 is a ring member 22 adapted to be interposed between packing ring 21 and housing 2 formed at its inner edge with a countersunk portion 23 adapted to extend to the inner surface of side 9 and with its shoulder 24 engageable with shoulder 25 surrounding the opening in side 9 and constituting a stop for said ring. The ring 22 extends beyond the outer end of packing ring 21 and is formed adjacent its outer edge with a thickened portion 26, said portion being internally countersunk to receive packing ring 27 engageable with packing gland 18. Ring 27 is threadedly engageable with threads 28 formed on housing 2 and is adjustably engageable with packing gland 18, and also maintains ring 22 in operative position. Integrally formed with or suitably secured to said ring 22 at the inner edge of the thickened portion is an operating arm 29 for effecting rotative movement of said ring with respect to housing 2 for a purpose hereinafter more fully explained. It will thus be seen that packing rings 17, 21, and 27 adjustably secure their respective packing glands 18 in position and prevent leakage of the fluid 19 from drum or casing D, as will be clear without further discussion. In the present instance, integrally formed on the inner edge of ring 22 is a plurality of equi-spaced upwardly and inwardly extending arms 30 terminating at their free ends in yokes 31 for a purpose more fully appearing as the description proceeds.

The inner surface of side 8 is formed with a plurality, in the present instance eight, of radially extending vanes or ribs 32 extending from hub member 15 to and across the inner surface of end wall 10, constituting transverse end vane sections 32' and to a point spaced from side 9 a distance equal to the width of said vane. Side 9 is formed with a corresponding number of vanes 33 adapted to form continuations of said vanes 32 and sections 32' when sides 8 and 9 are united by bolts 14, and thus forming centrally disposed rectangular U-shaped openings E.

An annular anchor member F comprising an inner ring portion 34 and an outer ring portion 35 of greater diameter than ring 34 and integrally connected therewith by spokes 36 is mounted on housing 2 adjacent flange 16 and secured to said housing by set screws 37. In the present instance ring 35 is of slightly less width than the opening E and the vanes 32 and 33 are correspondingly widened at their lower ends, so as to form with said ring the bottom wall of the respective openings E.

At the bottom of opening E and in alignment with the respective vanes 32 and 33, ring member 35 is formed with openings 38 adapted to receive pivot shafts 39 suitably formed on the lower ends of the respective blades 40 mounted in and operable to close the respective openings E, as and for a purpose hereinafter more fully appearing. Said blades 40 seat on and are semi-rotatable with respect to said ring 35 of member F. Each of said blades is secured by an arm 41 threadedly, keyed or otherwise secured to the free end of shaft 39, and which extends laterally therefrom and terminates in a right angular lug 42 adapted to engage in a respective yoke 31, whereby movement of arm 29 will effect simultaneous movement of said blades from open position, as shown in Fig. 3, to closed position, as shown in Fig. 4. To facilitate the operation of blades 40 as braking elements in conjunction with fluid 19, the respective blades are formed with concave sides 43.

Formed intermediate the ring portions 34 and 35 and the respective spokes 36 of anchor member F are an annular or circular series of openings G in each of which extends a lug 42 and yoke 31 for operating the respective blades 40. Each of the openings G extends to a point beyond opposite sides of the respective blades 40, so that while the fluid 19 will normally rotate with the rotating casing or drum and with respect to the normally stationary blades 40, when said blades are operated by lugs 42 and yoke 31 and framed by the openings E at predetermined points in the angular movement of the casing, the flow of the liquid will be retarded or substantially stopped, according to the extent of the movement of said blades in fluid retarding direction, and a certain portion of such fluid will escape and flow through the openings G, thereby preventing instant complete retardation of the circulation of the fluid, and consequent abrupt locking of the casing and its supporting wheel as will be well understood.

Side 8 is adapted to seat on flange 6' of hub member 6 and is secured thereto by bolts 8' thereby uniting drum D and the wheel structure B into a unitary structure so that said drum will rotate with the wheel and with respect to housing 2.

The drum D may be filled with oil or other suitable fluid through opening 44 closed by a plug 45 or other suitable means.

While the operation of the device would seem to be clear from the above description, it might be well to further state that when the device is applied to the respective wheels of an automobile and the arms 29 suitably connected to an operating means (not shown) in reach of the operator of the car, actuation of said operating means will simultaneously operate the blades within the respective drums.

Since the mechanisms as applied to the respective wheels are identical the operation of one only, as illustrated in Fig. 1, will be described in detail.

It is apparent that when the blades 40 are in inoperative or open position as clearly shown in Fig. 3, the fluid 19 in drum D will be caused to rotate within the drum by the vanes 32, 33, and sections 32', and with slight frictional contact with blades 40 owing to their position as shown in Fig. 3. When it is desired to apply a braking effect to wheel B, operation of arm 29 rotates ring 22 and yokes 31 through lugs 42 of arms 41 moving blades 40 about their longitudinal axes in braking direction from complete open position as shown in Fig. 3, to closed or complete braking position as shown in Fig. 4, and reverse movement of arm 29 returns said blades to their initial inoperative positions, as will be apparent. It will thus be seen, owing to their shape, that when the blades 40 are moved slightly from their complete open position, the contact of the liquid with their concave faces will tend to move them to complete closed position and tend to maintain them in such positions by the force of the liquid towards their longitudinal centers in alignment with pivot shafts 39 in compressing or retarding direction to transmit to said wheel a braking effect, the extent of movement of the blades being controlled by arm 29 in accordance with operating requirements. As the blades are moved in fluid retarding or braking direction they are framed by the openings E at predetermined points in the angular movement of the casing to close said openings and partially or completely stop the circulating flow of the liquid, and if the blades are suddenly brought to complete braking position locking of the wheel by an abrupt closing of the blades is tended to be prevented by the escape, under sudden pressure, of a certain amount of the fluid through openings G of anchor member F. It will thus be seen how the circulation of the liquid is controlled and that the operation of arm 29 will, as above explained, produce the same braking effect irrespective of the direction of travel of the wheel.

From the above it is apparent that I have designed a fluid braking mechanism, simple in construction, versatile in its adaptive use, applicable to automobiles already in use with slight alterations to existing structures, yet manufacturable at a minimum of cost, and efficient for the purposes intended.

Although in practice I have found that the form of my invention illustrated in the accompanying drawings and referred to in the above description, as the preferred embodiment, to be the most efficient and practical; yet, realizing the conditions concurrent with the adoption of my invention will necessarily vary, I desire to emphasize that various minor changes in detail of construction, proportion and arrangement of parts, may be resorted to within the scope of the appended claims without departing from or sacrificing any of the principles of this invention.

Having thus described my invention, and without enumerating variations and equivalents, what I desire protected by Letters Patent is as set forth in the following claims:

1. A fluid brake comprising a rotatable fluid-containing casing provided on its inner surface with a vane forming an opening, a movable blade adapted to be framed by the opening at predetermined points in the angular movement of the casing, means for arranging the angle of the blade within the opening for controlling the circulation of the fluid, said means including an oscillatory ring member, means in connection with the blade for preventing sudden locking of the casing, said means including a ring member.

2. A fluid brake comprising a rotatable fluid-containing casing provided on its inner surface with a vane forming an opening, a double concavo blade adapted to be framed by the opening at predetermined points in the angular movement of the casing, means for moving said blade from open to closed position with respect to said opening, whereby the concavo structure is adapted in conjunction with the fluid flow to aid in moving the blade to closed position and maintaining the same in such position irrespective of the direction of the circulation of the fluid.

3. A fluid brake comprising a rotatable fluid-containing casing formed on its surface with vanes forming openings, concavo blades adapted to be framed by the openings at predetermined points in the angular movement of the casing, an oscillatory member, and means between the member and concavo blades for controlling the circulation of the fluid by moving the blades from open to closed and from closed to open position with respect to the openings, and whereby the circulation of the fluid in conjunction with the concavo surfaces assists in moving the blades to closed position and maintaining the same in such position.

4. A fluid brake comprising a rotatable fluid-containing casing formed on its surface with a plurality of vanes forming openings, a blade adapted to be framed by the openings at predetermined points in the angular movement of the casing, means for changing the angular position of the blades to respectively open and closed positions, and means for preventing sudden locking of said casing when the blades are brought to sudden closed position, said means including a ring member.

5. A fluid brake comprising a rotatable fluid-containing casing formed on its surface with a plurality of vanes forming openings, a blade adapted to be framed by the openings at predetermined points in the angular movement of the casing, an oscillatory ring member, means between the ring and blade for moving the blades to respectively open and closed positions within the openings, and a spider-like anchoring member supporting the blades and having a circular series of openings for the passage of the fluid, whereby when the blades are moved suddenly to closed position with respect to their openings tending to retard the normal circulation of the fluid and rotation of the drum, a portion of the fluid will escape through the openings in said ring member so that abrupt locking of the casing will be prevented.

6. A fluid brake comprising a rotatable fluid containing casing formed on its surface with a plurality of vanes forming openings and adapted to effect circulation of the fluid, a blade adapted to be framed by the openings at predetermined points in the angular movement of the casing, means for changing the angular position of the blades to respectively open and closed positions, a blade supporting ring member having a series of openings corresponding to the number of blades and extending to points beyond opposite sides of the blades, whereby sudden locking of said casing when the blades are brought to sudden closed position is prevented by the escape of a certain quantity of the fluid under pressure through the openings in said ring member.

JOHN A. TOLMAN.